United States Patent [19]

Aratani et al.

[11] Patent Number: 5,694,379

[45] Date of Patent: Dec. 2, 1997

[54] MAGNETO-OPTICAL RECORDING MEDIUM AND RECORDING APPARATUS THEREFOR

[75] Inventors: Katsuhisa Aratani, Chiba; Atsushi Fukumoto, Kanagawa; Tatsuya Narahara, Kanagawa; Shin Masuhara, Kanagawa, all of Japan

[73] Assignee: Sony Corporation, Tokyo, Japan

[21] Appl. No.: 697,282

[22] Filed: Aug. 27, 1996

[30] Foreign Application Priority Data

Aug. 29, 1995 [JP] Japan .................................. 7-220580

[51] Int. Cl.$^6$ .................................................. G11B 11/00
[52] U.S. Cl. .................................... 369/13; 369/275.4
[58] Field of Search .......................... 369/13, 14, 275.4, 369/275.1, 110, 109, 277; 300/59, 114; 365/122

[56] References Cited

U.S. PATENT DOCUMENTS

| 5,406,546 | 4/1995 | Uchiyama et al. | 369/275.4 |
| 5,430,706 | 7/1995 | Utsunomiya et al. | 369/275.4 |
| 5,581,539 | 12/1996 | Horie et al. | 369/275.4 |

FOREIGN PATENT DOCUMENTS 3130948  6/1991  Japan .

*Primary Examiner*—Tan Dinh
*Attorney, Agent, or Firm*—Hill, Steadman & Simpson

[57] ABSTRACT

A magneto-optical recording medium capable of exhibiting a high track density and preventing occurrence of a crosstalk, is disclosed which is adapted for magneto-optically recording an information signal thereon and reproducing the signal therefrom by radiating a read or write beam through an objective lens, and includes a transparent substrate provided, on a partial or entire surface thereof, with spiral or concentric guide grooves and signal-recording regions located between the spiral or concentric guide grooves; wherein the magneto-optical recording medium is so constructed as to satisfy the following conditions (1) to (4):

$$0.431(\lambda/NA) < W < (0.8STP - 0.143)(\lambda/NA) \quad (1)$$

$$0.62(\lambda/NA) < TP < 0.80(\lambda/NA) \quad (2)$$

$$0.084(\lambda/n_s) < d < 0.18(\lambda/n_s) \quad (3)$$

and $$d/(\lambda/n_s) \geq 0.48 - 0.53TP/(\lambda/NA) \quad (4)$$

where W represents a width of the guide grooves; $\lambda$ represents a wavelength ($\mu$m) of the read light for reproducing the information signal stored on the magneto-optical recording medium; NA represents a numerical aperture of the objective lens; TP represents a track pitch ($\mu$m) of the guide grooves; d represents a depth (nm) of the guide grooves; and $n_s$ represents a refractive index of the transparent substrate.

3 Claims, 8 Drawing Sheets

MAGNETO-OPTICAL RECORDING MEDIUM AND RECORDING APPARATUS THEREFOR

BACKGROUND OF THE INVENTION

1. Field of the Invention

This invention relates to a magneto-optical recording medium and a recording apparatus therefor, and more particularly to a magneto-optical recording medium adapted for recording an information signal thereon by radiating a laser beam while applying a magnetic field thereto, and a recording apparatus for recording the information signal on the magneto-optical recording medium.

2. Prior Art

Hitherto, a track pitch TP of a magneto-optical recording medium has been limited by a spot diameter determined by a wave length $\lambda$ of a read light and a numerical aperture NA of an objective lens through which the read light is focused on the magneto-optical recording medium. Specifically, in the case where the track pitch is narrower than the spot diameter, signals on adjacent tracks are undesirably picked-up by the read light so that a so-called crosstalk phenomenon increasingly occurs. This has posed a problem that the signal cannot be accurately read from the aimed track. Under this circumstance, in order to avoid the crosstalk phenomenon, the track pitch is required to satisfy the following equation:

$$TP > 0.80 \lambda / NA$$

This limitation of the track pitch makes it impossible to increase a track density, i.e., a recording capacity beyond a given level.

In order to actually or effectively reduce the track pitch below the value given by the above-mentioned equation, there have been proposed various methods as disclosed in (1) A. Fukumoto et al., "Proceedings of Magneto-Optical Recording International Symposium'94," J. Magn. Soc. Jpn., vol. 19, Supplement No. S1 (1995), pp. 295–300, (2) T. Tanabe et al., "Proceedings of Magneto-Optical Recording International Symposium'94," J. Magn. Soc. Jpn., vol. 19, Supplement No. S1 (1995), pp. 359–362, (3) R. Matsuda et al., "Proceedings of Magneto-Optical Recording International Symposium 94, J. Magn. Soc. Jpn., vol. 19, Supplement No. S1 (1995), pp. 351–354, (4) A. Fukumoto et al., "Digest of Symp. on Optical Memory," (1994), p. 41, or the like.

However, the above-mentioned literatures (1) and (2) do not discuss at all a depth of guide grooves of the recording medium. That is, in these literatures, there is no teaching that the track density is improved by adjusting the depth of the guide grooves to an optimum value for realizing the narrower tracks.

On the other hand, the literature (3) discloses the use of a special substrate composed of a glass plate and a metal film deposited thereon on which spiral guide grooves are formed by a photolithography method, instead of a normal plastic substrate on which guide grooves are formed upon injection molding of the substrate. In this case, such a special substrate has however poses problems such as a low productivity, a high manufacturing cost, or the like, as compared with the normal plastic substrate.

Furthermore, differing from a normal recording method in which the signal is recorded on either an inside of each of the guide grooves or a region located between the guide grooves, the above-mentioned literature (4) discloses a method in which the track density is enhanced by recording signals on both the inside of each guide groove and the region located between the guide grooves. However, in this case, there arise problems concerning how the a switching operation between tracks is carried out, how pre-format addresses are recorded, or the like.

SUMMARY OF THE INVENTION

Accordingly, it is an object of the present invention to provide a magneto-optical recording medium having a high track density without occurrence of crosstalk phenomenon.

It is another object of the present invention to provide a recording apparatus suited to record signals on the magneto-optical recording medium and reproduce the signals therefrom.

In an aspect of the present invention, there is provided a magneto-optical recording medium adapted for magneto-optically recording an information signal thereon and reproducing the signal therefrom by radiating a read or write beam through an objective lens, including a transparent substrate provided, on a partial or entire surface thereof, with spiral or concentric guide grooves and signal-recording regions located between the spiral or concentric guide grooves; wherein the magneto-optical recording medium is so constructed as to satisfy the following conditions (1) to (4):

$$0.431(\lambda/NA) < W < (0.8TP - 0.143)(\lambda/NA) \quad (1)$$

$$0.62(\lambda/NA) < TP < 0.80(\lambda/NA) \quad (2)$$

$$0.084(\lambda/n_s) < d < 0.18(\lambda/n_s) \quad (3)$$

and $$d/(\lambda/n_s) \geq 0.48 - 0.53 TP/(\lambda/NA) \quad (4)$$

where W represents a width of the guide grooves; $\lambda$ represents a wavelength (μm) of the read light for reproducing the information signal stored on the magneto-optical recording medium; NA represents a numerical aperture of the objective lens; TP represents a track pitch (μm) of the guide grooves; d represents a depth (nm) of the guide grooves; and $n_s$ represents a refractive index of the transparent substrate.

In a second aspect of the present invention, there is provided a recording apparatus, including a magneto-optical recording medium having a transparent substrate provided on a partial or entire surface thereof with spiral or concentric guide grooves and signal-recording regions located between the spiral or concentric guide grooves, an objective lens disposed in an opposed relation to the magneto-optical recording medium, and a light-radiating means adapted to radiate a write laser beam in the form of pulses for recording an information signal, onto the magneto-optical recording medium through the objective lens, the laser beam having a duty factor of not more than 50%, wherein the recording apparatus is so constructed as to satisfy the following conditions (1) to (4):

$$0.41(\lambda/NA) < W < (0.8TP - 0.143)(\lambda/NA) \quad (1)$$

$$0.62(\lambda/NA) < TP < 0.80(\lambda/NA) \quad (2)$$

$$0.084(\lambda/n_s) < d < 0.18(\lambda/n_s) \quad (3)$$

and $$d/(\lambda/n_s) \geq 0.48 - 0.53 TP/(\lambda/NA) \quad (4)$$

where W represents a width of the guide grooves; λ represents a wavelength (μm) of the read light for reproducing the information signal stored on the magneto-optical recording medium; NA represents a numerical aperture of the objective lens; TP represents a track pitch (μm) of the guide grooves; d represents a depth (nm) of the guide grooves; and $n_s$ represents a refractive index of the transparent substrate.

In the magneto-optical recording medium according to the present invention, the track pitch is determined so as not to cause a crosstalk of higher than −25 dB while the depth of the guide grooves is determined so as not to cause a carrier-to-noise ratio (hereinafter referred to as "CNR") of lower than 45 dB. By setting a width of the guide grooves such that the track pitch and the depth of the guide grooves are present within such ranges, even if the recording density of the magneto-optical recording medium is enhanced, the magneto-optical recording medium limiting the crosstalk and the CNR to practically usable levels can be realized.

Further, since the difference between average refractive indices in the directions parallel and perpendicular to a surface of the substrate is set to not more than 0.0003, a magneto-optical recording medium having a high track density can be realized even in the case where the substrate is formed from, for example, a plastic material.

Furthermore, in accordance with the present invention, there can be also provided a recording method in which the track pitch is determined so as not to cause a crosstalk of higher than −25 dB, the depth of the guide grooves is determined so as not to cause a CNR of lower than 45 dB and the width of the guide grooves is set such that the track pitch and the depth of the guide grooves lie within such ranges, to thereby realize a magneto-optical recording medium having a high track density. Thus, when signals are recorded thereon, occurrence of the crosstalk is considerably prevented and signals can be recorded with an intensity enough to be reproduced. As a result, there can be provided a recording method suitable for the magneto-optical recording medium having a high track density.

These and other objects, features and advantages of the present invention will become more apparent from the following detailed description when read in conjunction with the accompanying drawings and appended claims.

DETAILED DESCRIPTION OF PREFERRED EMBODIMENTS

The present invention is described in more detail below by referring to FIGS. 1 to 16 in which specific examples of the magneto-optical recording medium and the recording apparatus therefor according to the present invention are illustrated.

Figure 1:
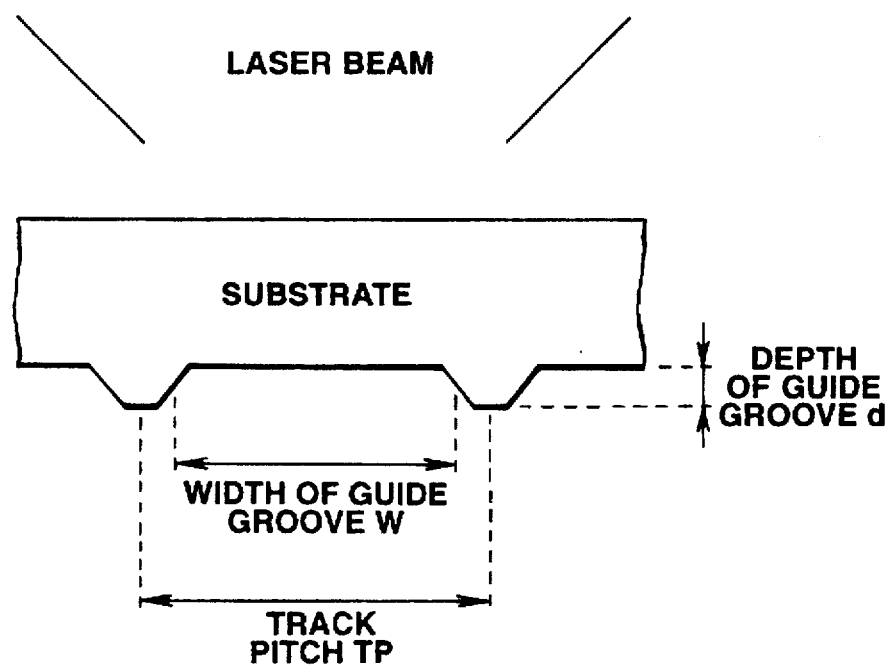
FIG. 1 is a schematic sectional view showing a preferred embodiment of a magneto-optical recording medium according to the present invention.

As shown in FIG. 1, an magneto-optical disc as one example of the magneto-optical recording medium according to the present invention includes a transparent substrate on a partial or entire surface of which spiral or concentric guide grooves are formed. Formed between the guide grooves are signal-recording regions. The magneto-optical disc is so constructed as to satisfy the following conditions (1) to (4):

$$0.431(\lambda/NA) < W < (0.8TP - 0.143)(\lambda/NA) \quad (1)$$

$$0.62(\lambda/NA) < TP < 0.80(\lambda/NA) \quad (2)$$

$$0.084(\lambda/n_s) < d < 0.18(\lambda/n_s) \quad (3)$$

and $$d/(\lambda/n_s) \geq 0.48 - 0.53 TP/(\lambda/NA) \quad (4)$$

where W represents a width of the guide grooves; λ represents a wavelength (μm) of the read light for reproducing the information data stored on the magneto-optical recording medium; NA represents a numerical aperture of the objective lens; TP represents a track pitch (μm) of the guide grooves; d represents a depth (nm) of the guide grooves; and $n_s$ represents a refractive index of the transparent substrate.

Incidentally, the width W of the guide grooves is a distance between d/2 depth points on opposite side walls of the guide groove where d represents the depth of the guide groove.

The value λ/NA represents a generalized value based on a wavelength of a read laser beam and a numerical aperture of an objective lens.

Figure 2:
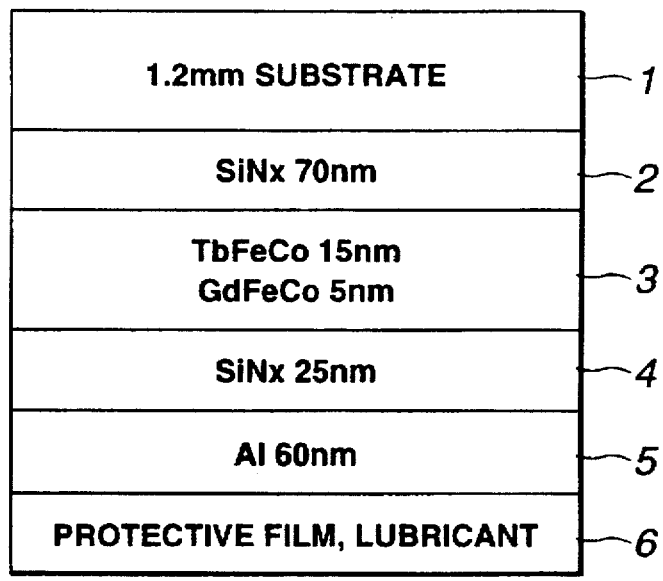
FIG. 2 is a view showing a layer arrangement together with materials for respective layers of the magneto-optical recording medium shown in FIG. 1.

In FIG. 2, there is shown a layer arrangement of the magneto-optical disc in which a first silicon nitride layer 2, a magnetic layer 3, a second silicon nitride layer 4, an aluminum layer 5 and a protective and lubricant layer 6 are in turn laminated on the transparent substrate 1.

The transparent substrate 1 is in the form of a glass plate having a thickness of 1.2 mm and prepared by a so-called 2P method (photo polymerization method), and provided thereon with guide grooves. The first silicon nitride layer 2 is in the form of a thin film having a thickness 70 nm and formed on a surface of the transparent substrate 1 by sputtering method.

The magnetic layer 3 is in the form of a thin film having a thickness of 20 nm and formed on a surface of the silicon nitride layer 2 by a sputtering method. Specifically, the magnetic layer 3 is in the form of interchangeably bonded two-layer film composed of an amorphous terbium-iron-cobalt (Tb-Fe-Co) layer having a thickness of, for example, 15 nm and a gadolinium-iron-cobalt (Gd-Fe-Co) layer having a thickness of, for example, 5 nm.

The second silicon nitride 4 is in the form of a thin film having a thickness of 25 nm and formed on a surface of the magnetic layer 3 by a sputtering method. Further, the aluminum layer 5 is in the form of a thin film having a thickness of 60 nm and formed on a surface of the second silicon nitride layer 4 by a sputtering method.

Formed on the aluminum layer 5 is a protective and lubricant layer 6 composed of a protective film made of an ultraviolet-curing resin and a silicone-based lubricant coated on a surface of the protective film.

Figure 3:
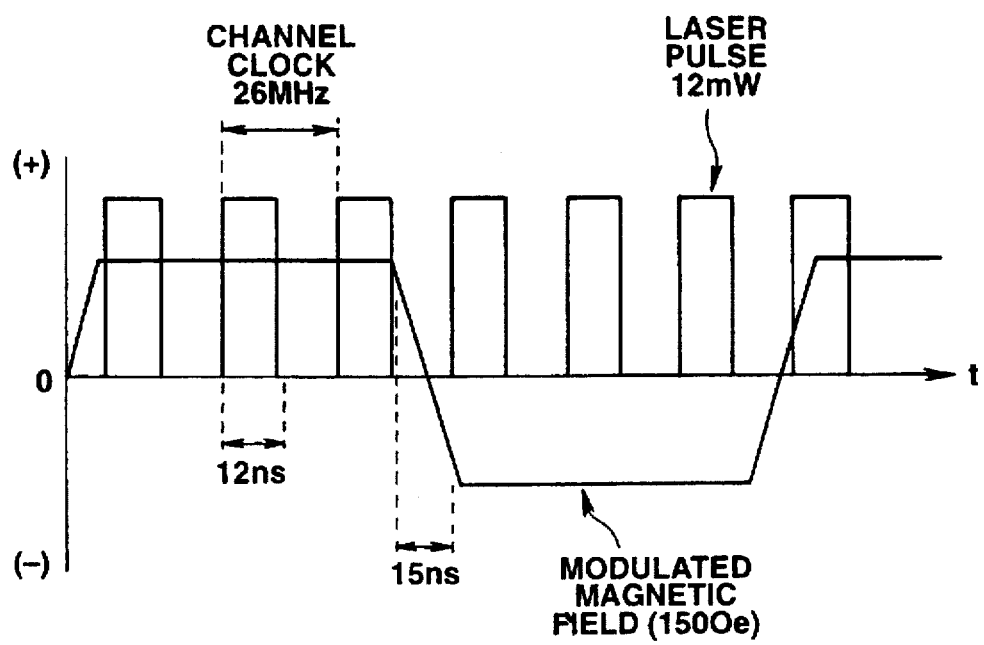
FIG. 3 is a timing chart schematically showing a relationship between a laser beam in the form of pulses and a modulation magnetic field applied.

Signals can be recorded on the magneto-optical disc by using, for example, a magnetic-filed modulation recording method. In FIG. 3, there is schematically illustrated a relationship between the write laser beam in the form of pulses and the modulation magnetic field applied- In addition, Table 1 shows various conditions used upon recording and reproducing of the magneto-optical disc.

TABLE 1

| Laser wavelength | 0.69 μm |
| --- | --- |
| Numerical aperture NA of objective lens | 0.55 |
| Read light power | 1.2 mW |
| Linear velocity | 4.5 m/s |
| Noise resolution bandwidth | 30 kHz |
| Code for measuring error rate | EFM channel clock 26 MHz |

As shown in FIG. 3, upon recording, the write laser beam is radiated at a pulse output power of 12 mW and a pulse width of 12 ns while maintaining the modulation magnetic field intensity at 150 Oe. The write laser beam has a constant pulse repetition period, i.e., a channel clock of 26 MHz, which period is synchronized with the modulation magnetic field applied. In addition, a spacing between adjacent pulses is 15 ns. As will be appreciated from Table 1, the read laser beam has a pulse output power of 1.2 mW.

Next, a width W of guide grooves, a track pitch TP and a depth d of the guide grooves of the magneto-optical disc according to the present invention are explained below. Meanwhile, in the following description, measured values of various parameters of the magneto-optical disc are those obtained when 1.6 MHz signal, which is preliminarily recorded thereon by radiating the write laser beam while applying the modulation magnetic field, is read-out under the reproduction conditions mentioned in Table 1 above.

Figure 4:
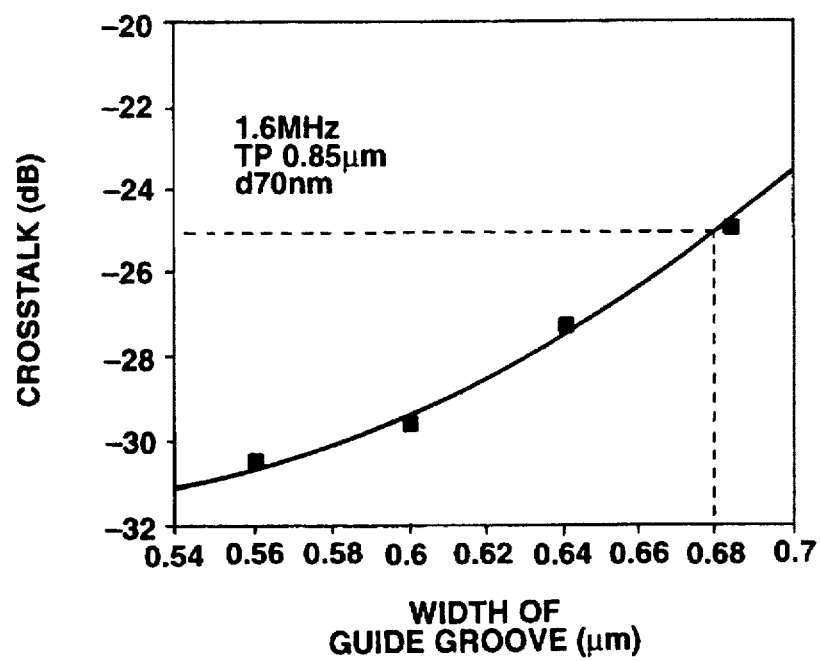
FIG. 4 is a plotted graph showing a relationship between crosstalk and width of guide grooves of the magneto-optical recording medium shown in FIG. 1.

By using the magneto-optical disc having a track pitch TP of 0.85 μm and a depth d of the guide grooves of 70 nm, a signal having a single frequency of 1.6 MHz is recorded within the guide grooves. FIG. 4 shows the relationship between the width W of the guide grooves and crosstalk while FIG. 5 shows the relationship between the width W of the guide grooves and the CNR evaluated at the respective guide grooves.

In FIG. 4, an ordinate axis of the graph represents the crosstalk (dB) and an abscissa axis thereof represents the width d (μm) of the guide grooves. In FIG. 5, an ordinate axis Of the graph represents the CNR (dB) and an abscissa axis thereof represents the width d (μm) of the guide grooves. In FIG. 5, the plotted curves are drawn relative to two recorded signals having frequencies of 1.6 MHz and 4.3 MHz, respectively.

Figure 5:
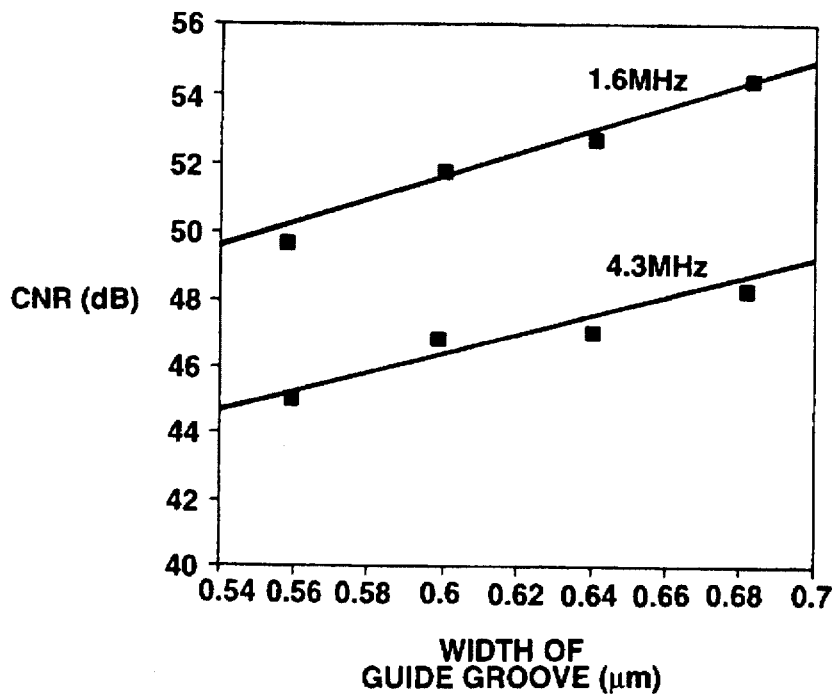
FIG. 5 is a plotted graph showing a relationship between the width of guide grooves and CNR of the magneto-optical recording medium shown in FIG. 1.

FIGS. 4 and 5 reveals that the crosstalk and the CNR becomes larger as the width W of the guide grooves of the magneto-optical disc is increased. It is also appreciated from the Figures that there is a tendency that the CNR is decreased as the frequency of the recorded signal becomes higher.

Figure 6:
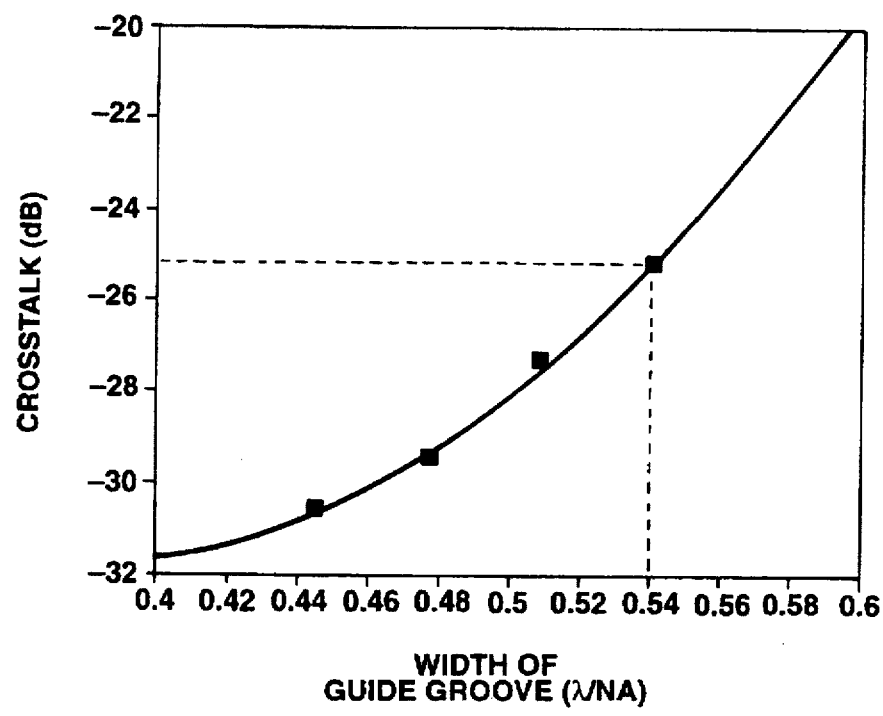
FIG. 6 is a plotted graph showing a relationship between the crosstalk and the width of guide grooves, which is similar to the graph shown in FIG. 4 except that the width of guide grooves is generalized by λ/NA.
Figure 7:
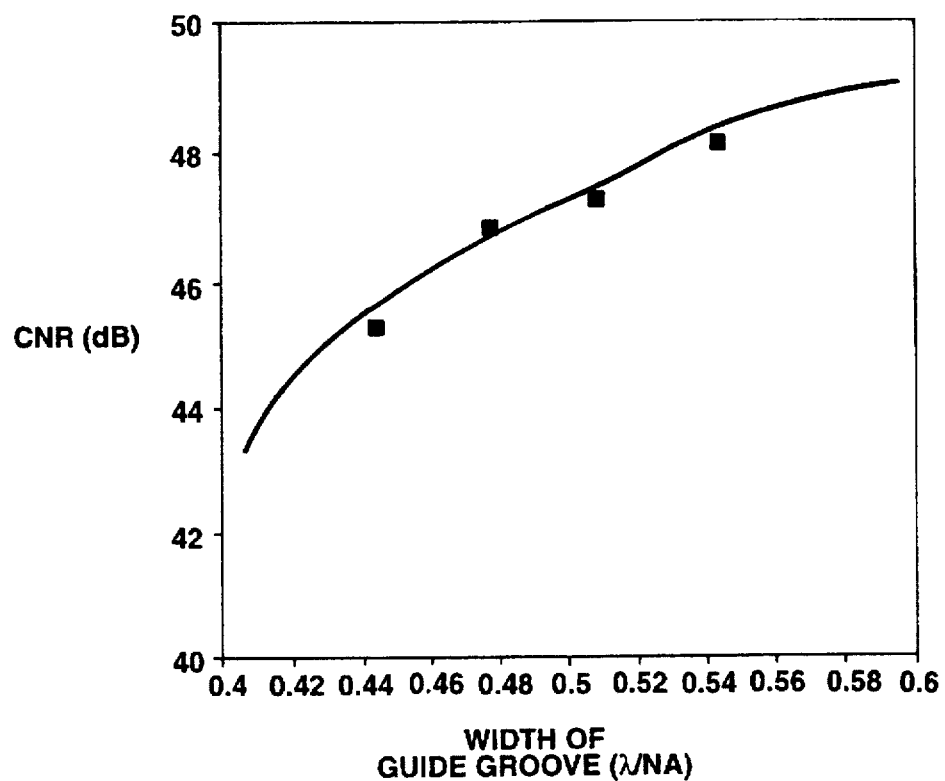
FIG. 7 is a plotted graph showing a relationship between the width of guide grooves and the CNR, which is similar to the graph shown in FIG. 5 except that the width of guide grooves is generalized by λ/NA.

Further, the results shown in FIGS. 4 and 5 are generalized by standardizing the track pitch and the width of the guide grooves by the wavelength λ of the laser beam and the numerical aperture NA of the objective lens as shown in Table 1. Also, in the generalization, the depth d of the guide grooves is standardized by the wavelength k of the laser beam and the refractive index $n_s$ of the transparent substrate as shown in Table 1. The generalized results are shown in FIGS. 6 and 7. In FIGS. 6 and 7, the refractive index $n_s$ of the transparent substrate is fixed to 1.5.

Specifically, in the case where the track pitch TP is 0.85 μm, the wavelength λ of the laser beam is 0.69 μm and the numerical aperture NA of the objective lens is 0.55, the generalized track pitch TP is represented by 0.68(λ/NA). In addition, in the case where the depth d of the guide grooves is 70 nm, the wavelength λ of the laser beam is 0.69 μm and the refractive index $n_s$ of the transparent substrate is 1.5, the generalized depth d of guide grooves is represented by 0.152(λ/$n_s$).

In FIG. 6, an ordinate axis of the graph represents the crosstalk (dB) and an abscissa axis thereof represents the generalized width d (λ/NA) of guide grooves which is standardized by using the wavelength λ of the laser beam and the numerical aperture NA of the objective lens. In FIG. 7, an ordinate axis of the graph represents the CNR (dB) and an abscissa axis thereof represents the width d (λ/NA) of guide grooves which is standardized by using the wavelength λ of the laser beam and the numerical aperture NA of the objective lens. Further, in FIG. 7, only a single plotted curve is drawn relative to the recorded signal having a frequency of 1.6 MHz.

Figure 8:
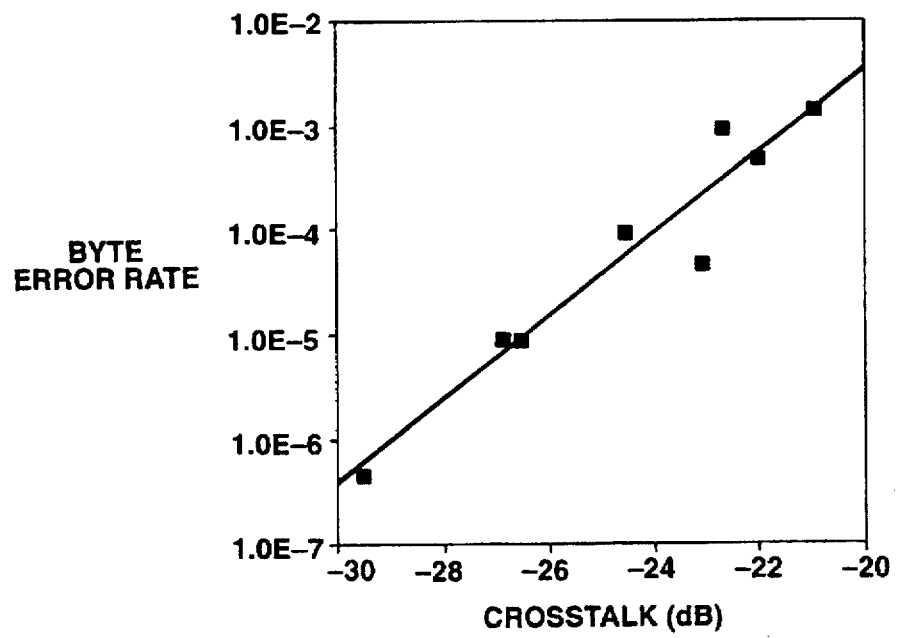
FIG. 8 is a plotted graph showing a relationship between the crosstalk and a byte error rate generated upon reproduction the magneto-optical recording medium according to the present invention.

In order to determine an allowable degree of the crosstalk, a relationship between a byte error rate and the crosstalk is examined by varying a degree of warpage of the magneto-optical disc in a radial direction thereof to intendedly cause the change in the crosstalk. The relationship is shown in FIG. 8. Meanwhile, the linear recording density is 0.35 μm/bit (the standardized value is 0.279 (λ/NA)/bit) and the error rate is estimated by EFM code used in EFM (eight to fourteen modulation) system which is a modulation system for digital audio discs.

In general, when the byte error rate is not more than $1 \times 10^{-4}$ the error correction can be made by a normal method, i.e., by using ECC (error correction code) with a redundancy. Accordingly, as will be appreciated from FIG. 8, if the crosstalk is not more than -25 dB, the error correction can be made by the normal method using ECC.

In the case of the same linear recording density, the modulation system using the EFM code is likely to be influenced by the crosstalk to a great extent, because the EFM code has a narrower data window than other codes. Consequently, when the code having a wider data window, for example, NRZI (non-return-to-zero-inverted) code or (1, 7) code, is used, the error rate becomes lower than that in the case where the EFM code is used, even if the same degree of the crosstalk occurs. Accordingly, the present invention can be effectively applied to such modulation systems in which codes having wider data window are used.

Referring back to FIGS. 4 and 5, when the crosstalk is -25 dB or lower, the width W of the guide grooves not more than 0.68 μm (the standardized value is represented by 0.54 (λ/NA)). Also, in order to enhance the linear recording density, it is preferred that the CNR value is larger. Consequently, the large width W of the guide grooves is advantageous reverse to the case of the crosstalk. An optimum level of the CNR is varied depending upon the codes and bands used. However, in general, the suitable CNR value is not less than 45 dB. Due to this fact, it is preferred that the width W of the guide grooves is not less than about 0.54 μm or its standardized value is represented by 0.43(λ/NA) or more. Practically, the CNR value has a tolerance of ±1 to 2 dB.

Accordingly, it is preferred that the width W of the guide grooves may be in the range of 0.54 to 0.68 μm, or the standardized width of the guide grooves may be in the range of 0.43 to 0.54(λ/NA).

In the afore-mentioned embodiment, there is illustrated the case where the track pitch TP is set to 0.85 μm. In order to generalize the conditions, other values of the track pitch TP are considered below.

In the case where the track pitch is greater than 0.85 μm the width W of the guide grooves is merely necessary to meet the requirement of the following equation (6) to limit the crosstalk to -25 dB or lower.

$$W<(TP-0.85+0.68) \ \mu m, \ namely$$

$$w<(TP-0.17) \ \mu m \qquad (6)$$

By satisfying the afore-mentioned equation (6), when the track pitch TP is widened so that the width W of the guide grooves becomes correspondingly wider, an amount of signals recorded is increased. Further, the crosstalk is decreased due to the widened track pitch.

The lower limit of the width W of the guide grooves is determined so as not to produce the CNR value of less than 45 dB. In this case, even when the track pitch TP is somewhat fluctuated, approximately same carrier level can be obtained if the width W of the guide grooves is identical. For this reason, the CNR value is maintained at a constant level irrespective of the track pitch. Accordingly, the lower limit of the width W of the guide grooves is 0.54 μm. In other words, the width W of the guide grooves may be 0.54 μm or more.

Next, the condition in which the track pitch is narrower than 0.85 μm, is considered. In this case, when the signal is recorded on the magneto-optical disc having a track pitch of 0.80 μm, a width W of guide grooves of 0.67 μm and a depth d of guide grooves of 70 nm and reproduced therefrom under the recording and reproducing conditions shown in Table 1, the crosstalk generated is -25 dB. Accordingly, under the condition of 0.80 μm<TP<0.85 μm, the width W of the guide grooves is merely necessary to meet the requirement of the equation (7):.

$$W<(TP-0.85+0.67) \ \mu m, \ namely$$

$$W<(TP-0.18) \ \mu m$$

$$where \ 0.80 \ \mu m<TP<0.85 \ \mu m \qquad (7)$$

Thus, in the case where the track pitch is greater than 0.80 μm, if the width W of the guide grooves can satisfy the afore-mentioned equation (7), the limitation required by the crosstalk can be also clear. That is, if the magneto-optical disc having the track pitch and the width W of the guide grooves, which lie within the afore-mentioned ranges, is reproduced, no problem is posed by the crosstalk. Similarly, if the magneto-optical disc having a track pitch of 0.80 μm or more and a width W of the guide grooves of 0.54 μm or more is reproduced, no problem is posed by the CNR value, so that the reproduction of the magneto-optical disc can be performed with a sufficient CNR value.

The width W of the guide grooves is merely necessary to meet the requirement of the following equation (8):

$$0.54 \ \mu m<W<(TP-0.18) \ \mu m, \ where \ 0.80 \ \mu m<TP, \ \lambda=0.69 \ \mu m \ and \ NA=0.55 \qquad (8)$$

By using the wavelength λ of the read laser beam and the numerical aperture NA of the objective lens, the aforementioned equation is generalized as follows.

$$0.431(\lambda/NA)<W<(0.8TP-0.143)(\lambda/NA) \qquad (9)$$

Next, in order to determine an optimum depth d of the guide grooves, the magneto-optical discs having various depths d of the guide grooves are subjected to reproduction tests. In these case, the track pitch is set to 0.85 μm and the width W of the guide grooves is set to 0.60 μm. If the track pitch other than 0.85 μm is used, the ratio of the track pitch to the width W of the guide grooves remains unchanged, i.e., the ratio of 0.85 μm to 0.60 μm is maintained. The results of evaluations for the crosstalk and the CNR value are illustrated in FIGS. 9 and 10.

Figure 9:
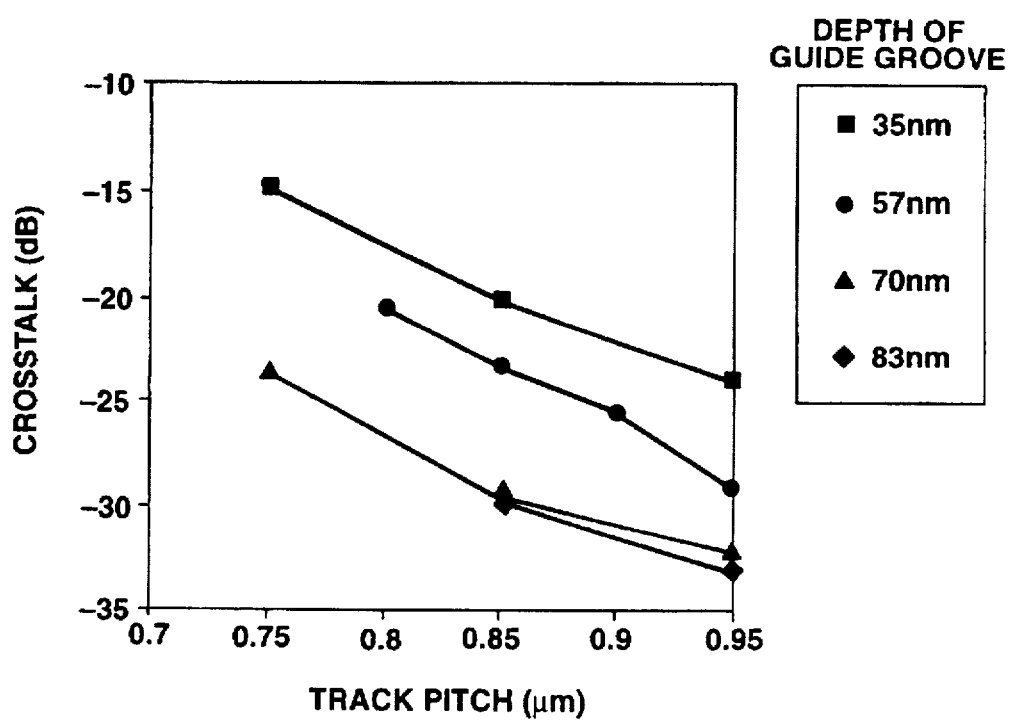
FIG. 9 is a plotted graph showing a relationship between the track pitch and the crosstalk of the magneto-optical recording medium according to the present invention, in which the plots are made relative to each depth of the guide grooves.
Figure 10:
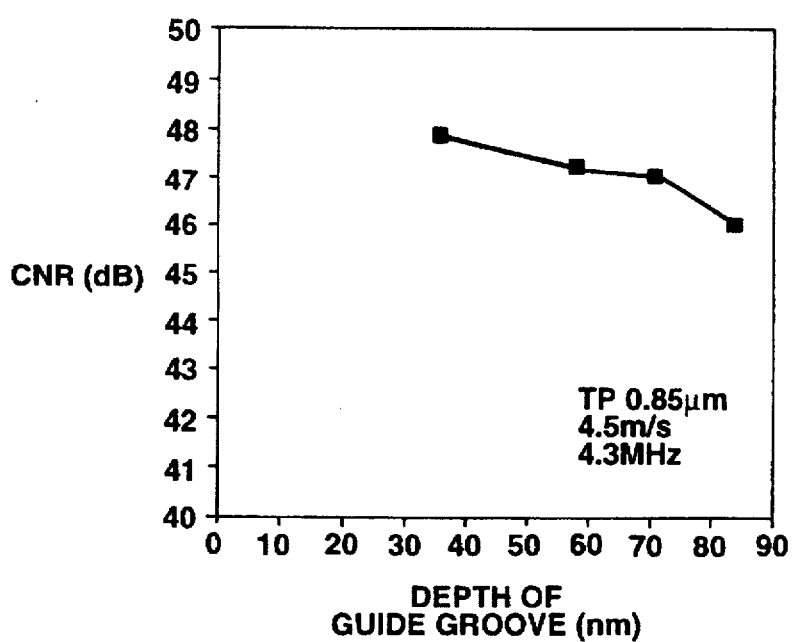
FIG. 10 is a plotted graph showing a relationship between the depth of the guide grooves and the CNR of the magneto-optical recording medium according to the present invention.

FIG. 9 shows a relationship between the track pitch and the crosstalk in which the plotted curves are drawn relative to the respective depths of the guide grooves of 35 nm, 57 nm, 70 nm and 83 nm. Whereas, FIG. 10 is a plotted graph showing a relationship between the depth d of the guide grooves and the CNR value.

As will be appreciated from FIG. 9, if the track pitch and the depth of the guide grooves are large to some extent, the crosstalk of not more than -25 dB can be obtained. In addition, as will be appreciated from FIG. 10, as the depth of the guide grooves becomes large, the CNR value is slightly decreased. For example, the comparison between the CNR values measured at the depths d of the guide grooves of 83 nm and 70 nm reveals that the CNR value at the depth d of 83 nm is smaller only by about 1 dB than that at the depth of 70 nm. As described above, such a difference in the CNR value as small as 1 dB can lie within the allowable range. Therefore, it can be estimated that the upper limit of the width d of the guide grooves due to the CNR value is 83 nm.

Also, the depth d of the guide grooves is a function of the wavelength λ of the read laser beam and the refractive index $n_s$ of the light-transmitting substrate. Consequently, in order to generalize the parameter, it is required that the depth d of the guide grooves is standardized using these variables. For example, the depth d of the guide grooves of 83 nm at which the wavelength λ of the read laser beam is 0.69 μm and the refractive index $n_s$ of the substrate is 1.5, is standardized as 0.15(λ/ns).

Figure 11:
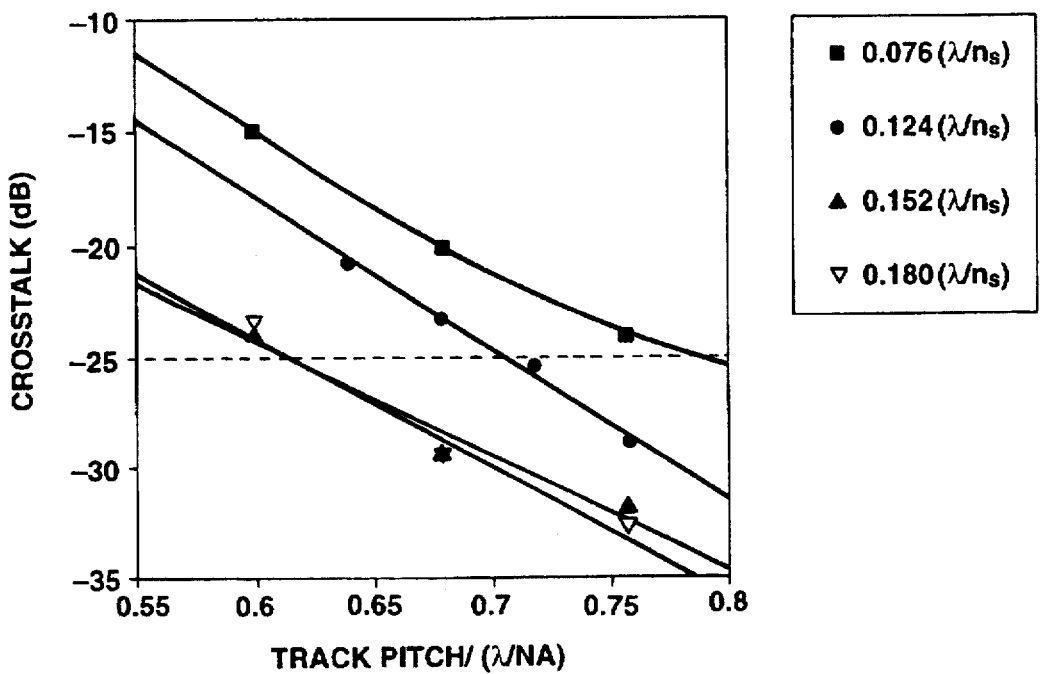
FIG. 11 is a plotted graph showing a relationship between the track pitch and the crosstalk, which is similar to the graph shown in FIG. 9 except that the track pitch is generalized by λ/NA and the depth of guide grooves is generalized by $\lambda/n_s$.
Figure 12:
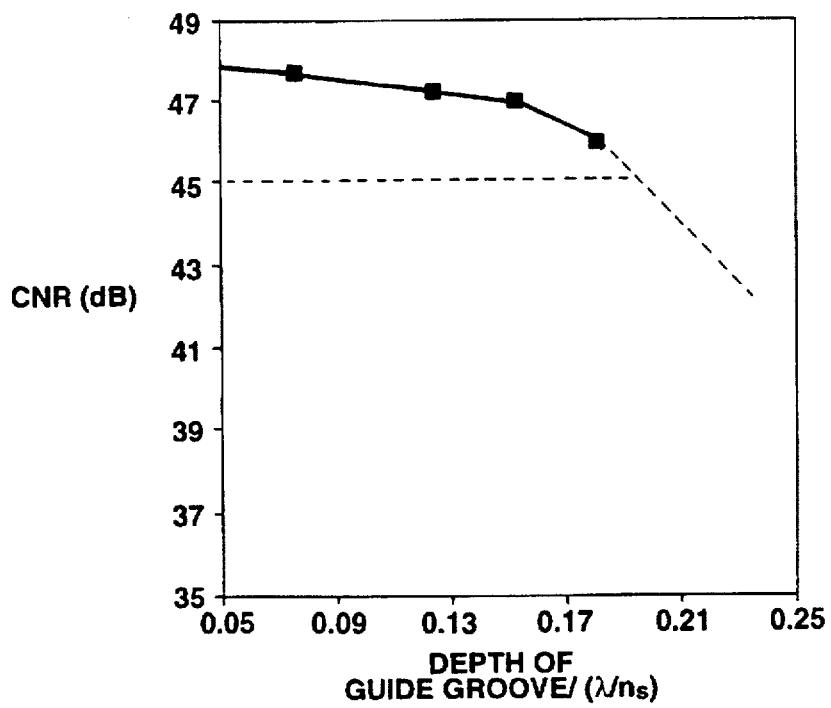
FIG. 12 is a plotted graph showing a relationship between the depth of guide grooves and the CNR, which is similar to the graph shown in FIG. 10 except that the depth of guide grooves is generalized by $\lambda/n_s$.

The track pitches and the depths of the guide grooves thus-standardized to generalize the results shown in FIGS. 9 and 10, are plotted as shown in FIGS. 11 and 12. In FIG. 11, the plots are made with respect to the standardized depths of the guide grooves of 0.076(λ/$n_s$), 0.124(λ/$n_s$), 0.152(λ/$n_s$) and 0.180(λ/$n_s$) which correspond to 35 nm, 57 nm, 70 nm and 83 nm, receptively.

Figure 13:
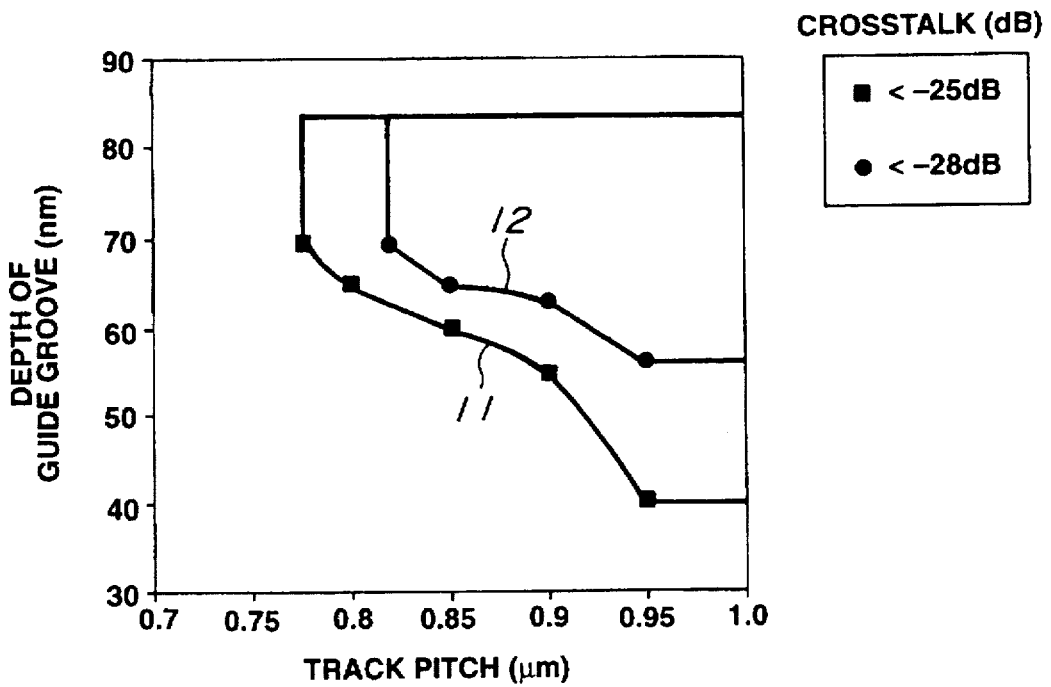
FIG. 13 is a plotted graph showing a relationship between the track pitch by which a high track density can be realized, and the depth of guide grooves.

The graph in which the depths of the guide grooves are plotted relative to the respective track pitches capable of realizing a crosstalk of −25 dB or lower or −28 dB or lower are illustrated in FIG. 13. The curve 11 represented by the square plots indicates the range in which the crosstalk of −25 dB or lower can be realized, while the curve 12 represented by the circular plots indicates the range in which the crosstalk of −28 dB or lower can be realized.

As will be appreciated from FIG. 13, the track pitch TP and the depth d of the guide grooves in which almost no problem is posed by the crosstalk upon the reproduction of the magneto-optical disc, i.e., the crosstalk is not more than −25 dB and high density recording can be therefore realized, is preferably within a range satisfying about 0.77 μm<TP<1.0 μm and 40 nm<d<83 nm and surrounded by the curve 11.

Further, in order to provide a recording and reproducing system capable of realizing a high-reliable and high-density recording, the track pitch TP and the depth d of the guide grooves are determined so as to limit the crosstalk to, for example, −28 dB or lower. The track pitch TP and the depth d of the guide grooves capable of realizing such a high-reliable and high-density recording, is preferably within a range satisfying 0.84 μm<TP<1.0 μm and 56 nm<d<83 nm and surrounded by the curve 12.

The reason why the upper limit of the track pitch TP is set to 1.0 μm in any of the afore-mentioned embodiments is as follow.

That is, as described above, the track pitch TP is conventionally required to satisfy the following equation (5):

$$TP > 0.80 \lambda/NA \qquad (5)$$

Here, the substitution of λ=0.69 μm and NA=0.55 results in TP>1.0.

Thus, the track pitch TP must be conventionally 1.0 μm or more. On the other hand, the essential feature of the present invention resides in realizing a higher density track pitch as compared with the conventional track pitch.

Figure 14:
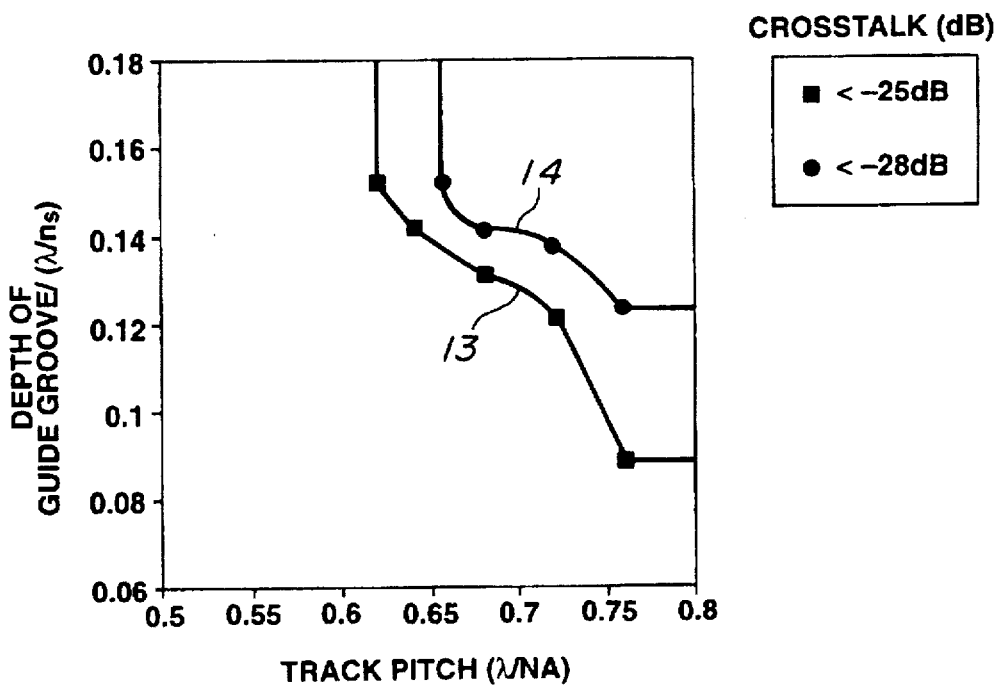
FIG. 14 is a plotted graph showing a relationship between the track pitch and the depth of guide grooves, which is similar to the graph of FIG. 13 except that the track pitch is generalized by λ/NA and the depth of guide grooves is generalized by $\lambda/n_s$.

In FIG. 14, there is illustrated the standardized graph derived from that shown in FIG. 13. In FIG. 14, an ordinate axis of the graph represents a standardized value of depth/ (λ/$n_s$) while an abscissa axis thereof represents a standardized value of track pitch/(λ/NA). Furthermore, in FIG. 14, the curve 13 is plotted in the case where the crosstalk of −25 dB or lower is realized, while the curve 14 is plotted in the case where the crosstalk of −28 dB or lower is realized.

As will be appreciated from FIG. 14, in order to realize a high density recording in which the crosstalk is −25 dB or lower, the combination of the track pitch TP and the depth d of the guide grooves is preferably within a range satisfying 0.62(λ/NA)<TP<0.8(λ/NA) and 0.084(λ/$n_s$)<d<0.18(λ/$n_s$) and surrounded by the curve 13. Similarly, in order to realize a high density recording in which the crosstalk is −28 dB or lower, the combination of the track pitch TP and the depth d of the guide grooves is preferably within a range satisfying 0.66(λ/NA)<TP<0.8(λ/NA) and 0.121(λ/$n_s$)<d<0.18(λ/$n_s$) and surrounded by the curve 14.

The generalized curve 13 is represented by the following equation:

$$d/(\lambda/n_s) \geq -0.53 TP/(\lambda/NA) + 0.48$$

As understood from the afore-mentioned equation, in order to realize the high density recording in which the crosstalk is −25 dB or lower, the combination of the standardized track pitch TP and the standardized depth d of the guide grooves is preferably within a range satisfying the following equations to (4):

$$0.62(\lambda/NA) < TP < 0.80(\lambda/NA) \qquad (2)$$

$$0.084(\lambda/n_s) < d < 0.18(\lambda/n_s) \qquad (3)$$

and $$d/(\lambda/n_s) \geq -0.53 TP/(\lambda/NA) + 0.48 \qquad (4)$$

In general, in case that a magneto-optical signal is reproduced by radiating a read beam through the transparent substrate, it is known that a quality of the signal reproduced is deteriorated due to birefringence of the substrate. The deterioration of the signal quality due to the birefringence phenomenon becomes more serious as linear recording density and track density are increased.

Normally, as a material for the substrate of the magneto-optical disc, a polycarbonate resin has been used. It is known that the polycarbonate resin is superior in duplication of the guide grooves or like configurations upon molding, a softening temperature, water-absorption or the like, to those of other materials. However, the polycarbonate resin more readily exhibits a birefringence, for example, as compared with an acrylic resin such as polymethyl methacrylate (PMMA) which is used as an electron beam resist in processing of an ultra-large scale integrated circuit. Especially, it is known that the difference between the refractive indices in the in-plane and thickness directions is large.

Under these circumstances, a polycarbonate substrate on which the guide grooves are formed by an injection-molding method and a 2P glass substrate prepared by a 2P (photo polymerization) method are compared with each other with respect to their birefringences and crosstalks.

Meanwhile, the molding conditions such as mold temperature upon the injection-molding and the annealing condition of the substrate after molding are adjusted to an optimum level so as to minimize the birefringence in the in-plane direction of the substrate.

Figure 15:
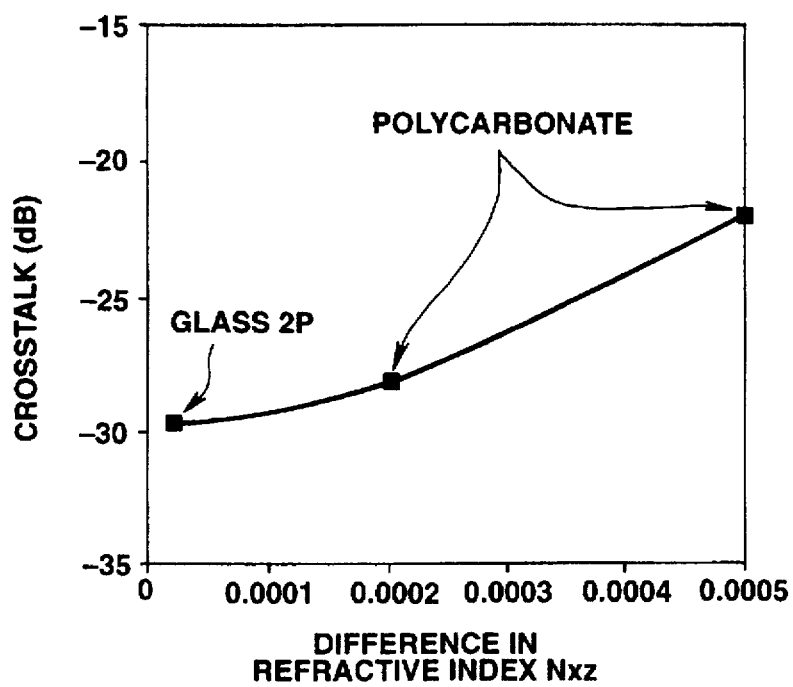
FIG. 15 is a graph showing a relationship between a difference between average refractive indices of a substrate of the magneto-optical recording medium in the directions parallel and perpendicular to a surface of the substrate, and the crosstalk.

FIG. 15 shows a relationship between the difference Nxz between the refractive indices in the thickness and in-plane directions of the polycarbonate and glass 2P substrates, and the crosstalk. Meanwhile, the refractive index in the thickness direction is measured by using a laser beam being incident at an oblique angle relative to a surface of the substrate. The measured refractive indices are average values in the respective directions. The measurements are made on a magneto-optical disc having a track pitch of 0.85 μm and a depth of guide grooves of 70 nm.

As will be appreciated from FIG. 15, as the difference Nxz in the refractive index is increased, the crosstalk is also increased. As described above, the crosstalk must be limited to −28 dB or lower in view of its redundancy. However, if an attempt is made to realize such a crosstalk of −25 dB or lower with respect to the polycarbonate substrate, the track pitch and the depth of the guide grooves are out of the preferred range obtained with respect to those of the glass substrate.

Assuming that the amount of the crosstalk being increased due to the birefringence is about 3 dB, in order to realize the same effect as the crosstalk of −25 dB or lower in the case of the glass substrate, it is suitable to limit the crosstalk of the polycarbonate substrate to −28 dB or lower. Accordingly, it is preferred that the difference Nxz in refractive index is 0.0003 or lower.

Thus, high track density can be also realized by using a plastic substrate such as the polycarbonate substrate which is less expensive than the glass substrate.

Next, a method for recording a signal onto the aforementioned magneto-optical disc is described below.

The recording method according to the present invention is applied to the magneto-optical disc which satisfies the following equations (1) to (4):

$$0.431(\lambda/NA) < W < (0.8TP - 0.143)(\lambda/NA) \quad (1)$$

$$0.62(\lambda/NA) < TP < 0.80(\lambda/NA) \quad (2)$$

$$0.084(\lambda/n_s) < d < 0.18(\lambda/n_s) \quad (3)$$

and $$d/(\lambda/n_s) \geq 0.48 - 0.53 TP/(\lambda/NA) \quad (4)$$

The feature of the recording method according to the present invention resides in that the laser beam used for recording or erasing the signals stored on the aforementioned magneto-optical disc has a luminous energy which varies with elapsed time and oscillated in a pulse fashion, and further the laser beam in the form of pulses exhibits a duty factor (pulse duty) of not more than 50%.

In general, as the track pitch is decreased, problems posed on the crosstalk upon reproduction or influences on the adjacent tracks upon recording becomes more serious. Further, in the magneto-optical recording system, when the laser beam for recording or erasing the signals is radiated on the signal-recording region, the, magnetic layer on the region is subjected to a temperature rise. At this time, if the track pitch is narrow, there is a likelihood that the tracks adjacent to the track to be recorded or erased are also subjected to serious temperature rise, so that information data preliminarily stored on the adjacent tracks are erased at worst.

In order to achieve a high track density of the magneto-optical disc without such inconveniences, it is required to limit a heat diffusion to the adjacent tracks to a level as low as possible.

In order to prevent such a heat diffusion, it is considered that the magnetic layer is composed of a material having a low thermal conductivity. However, this causes problems such as deterioration in intensity of the magneto-optical signals to be recorded.

In accordance with the present invention, as the recording and erasing light, there can be used a laser beam in the form of pulses which has a short radiation time as compared with the continuously radiated laser beam. Therefore, when the laser beam is radiated on the magneto-optical disc, temperature rise on the magnetic layer is consistent with a profile of intensity of the laser beam focused thereon, whereby the heat diffusion through the magnetic layer is restricted to a minimum level.

In general, magneto-optical recording methods are classified into two major categories, one is a light modulation method and the other is a magnetic-field modulation method. In the former light modulation method, the information data on the magneto-optical disc is erased prior to recording of fresh data. For this reason, the light modulation method normally employs a continuously radiated laser beam. Similarly, in the latter magnetic-field modulation method, the continuously radiated laser beam is used sometimes. In both the afore-mentioned methods, when a magneto-optical disc having a high track density is used, there occurs a tendency that the crosstalk is increased, that is, there is a likelihood that the continuously radiated laser beam is no longer suited to the narrower track pitch.

Under these circumstances, influences on adjacent tracks are examined as to the case where 3T signal, i.e., a signal having a mark length of 0.52 μm is recorded on a magneto-optical disc produced by using a glass 2P plate having a track pitch of 0.85 μm and a depth of guide grooves of 70 nm, by the magnetic-field modulation method in which the linear velocity of 4.5 m/s and the channel clock of 26 MHz (38.5 ns) are employed.

Figure 16:
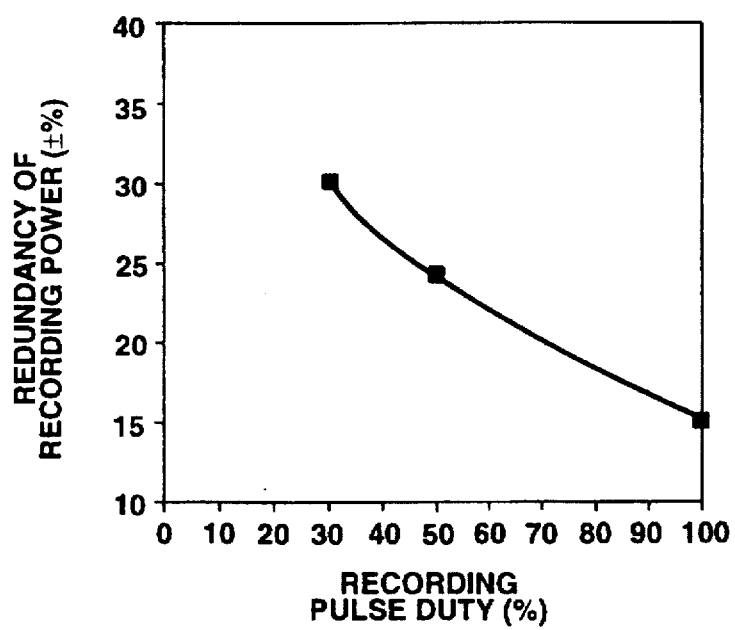
FIG. 16 is a graph showing a relationship between a recording pulse duty and a redundancy of recording power.

The results are shown in FIG. 16.

In FIG. 16, an ordinate axis of the graph indicates a redundancy (%) of the recording light power and an abscissa axis of the graph indicates a recording pulse duty (duty factor) (%). The pulse duty is a ratio of the pulse width to the channel clock of the recording laser beam, which synchronized with the magnetic field applied. In the aforementioned examination, the pulse duty is changed to 31%, 50% and 100%, where the 100% pulse duty means the continuously radiated laser beam.

Further, the redundancy of the recording light power is a value for. determining a degree of influence of the heat on adjacent tracks. The degree of influence of the heat on the adjacent tracks corresponds to a recording light power range enough to reproduce the signal stored the aimed track without damage to the adjacent tracks. Specifically, signals are preliminarily recorded on the adjacent tracks located on opposite sides of the aimed track by using saturation recording power. Signal is then recorded on the aimed track while varying the recording light power so as to determine an adequate range of the usable recording light power in which the signal can be recorded with a level lower by 1 dB or less than that recorded by the saturation recording light power and deterioration of the signal level recorded on the adjacent tracks is 0.1 dB or less. The redundancy of the recording power is obtained from the thus-determined range thereof.

As will be appreciated from FIG. 16, the redundancy of the recording light power is decreased as the recording pulse duty is increased. The redundancy, of the recording light power required for a magneto-optical system is generally ±20%, preferably about +25% or more or about −25% or less. In order to satisfy the requirement, it is necessary to perform recording, or erasing upon the light modulation recording, with a pulse laser beam having a pulse duty of 50% or less.

When the recording is carried out by using such a pulse laser beam, it is not necessarily required to interrupt the operation of the laser during the intermediate period between pulses. The laser may be driven for the intermediate period between the pulses so as to radiate a laser beam having a power which is about 20% or less of a peak power of the pulse laser beam.

What is claimed is:

1. A magneto-optical recording medium adapted for magneto-optically recording an information signal thereon and reproducing the signal therefrom by radiating a read or write beam through an objective lens, comprising:

a transparent substrate provided, on a partial or entire surface thereof, with spiral or concentric guide grooves and signal-recording regions located between the spiral or concentric guide grooves;

wherein said magneto-optical recording medium is so constructed as to satisfy the following conditions (1) to (4):

$$0.431(\lambda/NA) < W < (0.8TP - 0.143)(\lambda/NA) \quad (1)$$

$$0.62(\lambda/NA) < TP < 0.80(\lambda/NA) \quad (2)$$

$$0.084(\lambda/n_s) < d < 0.18(\lambda/n_s) \quad (3)$$

and $$d/(\lambda/n_s) \geq 0.48 - 0.53 TP/(\lambda/NA) \quad (4)$$

where W represents a width of the guide grooves; $\lambda$ represents a wavelength (μm) of the read light for reproducing the information signal stored on the magneto-optical recording medium; NA represents a numerical aperture of the objective lens; TP represents a track pitch (μm) of the guide grooves; d represents a depth (nm) of the guide grooves; and $n_s$ represents a refractive index of the transparent substrate.

2. The magneto-optical recording medium as claimed in claim 1, wherein a difference between an average refractive index in the direction parallel to the surface of said transparent substrate and an average refractive index in the direction perpendicular thereto is not more than 0.0003.

3. A recording apparatus, comprising:

a magneto-optical recording medium having a transparent substrate provided on a partial or entire surface thereof with spiral or concentric guide grooves and signal-recording regions located between the spiral or concentric guide grooves, an objective lens disposed in an opposed relation to said magneto-optical recording medium; and a light-radiating means adapted to radiate a write laser beam in the form of pulses for recording an information signal, onto said magneto-optical recording medium through said objective lens, said laser beam having a duty factor of not more than 50%, wherein said recording apparatus is so constructed as to satisfy the following conditions (1) to (4):

$$0.431(\lambda/NA) < W < (0.8TP - 0.143)(\lambda/NA) \quad (1)$$

$$0.62(\lambda/NA) < TP < 0.80(\lambda/NA) \quad (2)$$

$$0.084(\lambda/n_s) < d < 0.18(\lambda/n_s) \quad (3)$$

and $$d/(\lambda/n_s) \geq 0.48 - 0.53 TP/(\lambda/NA) \quad (4)$$

where W represents a width of the guide grooves; $\lambda$ represents a wavelength (μm) of the read light for reproducing the information signal stored on, the magneto-optical recording medium; NA represents a numerical aperture of the objective lens; TP represents a track pitch (μm) of the guide grooves; d represents a depth (nm) of the guide grooves; and $n_s$ represents a refractive index of the transparent substrate.

* * * * *